Figure 1:
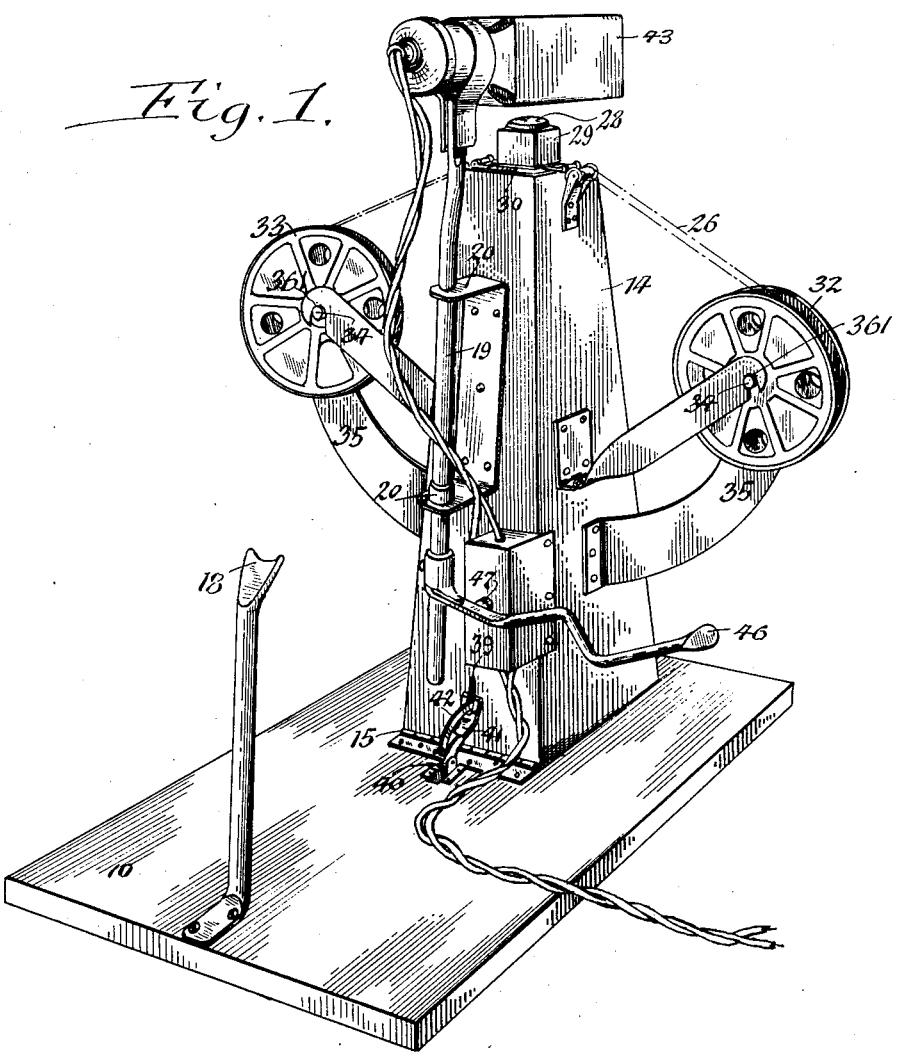

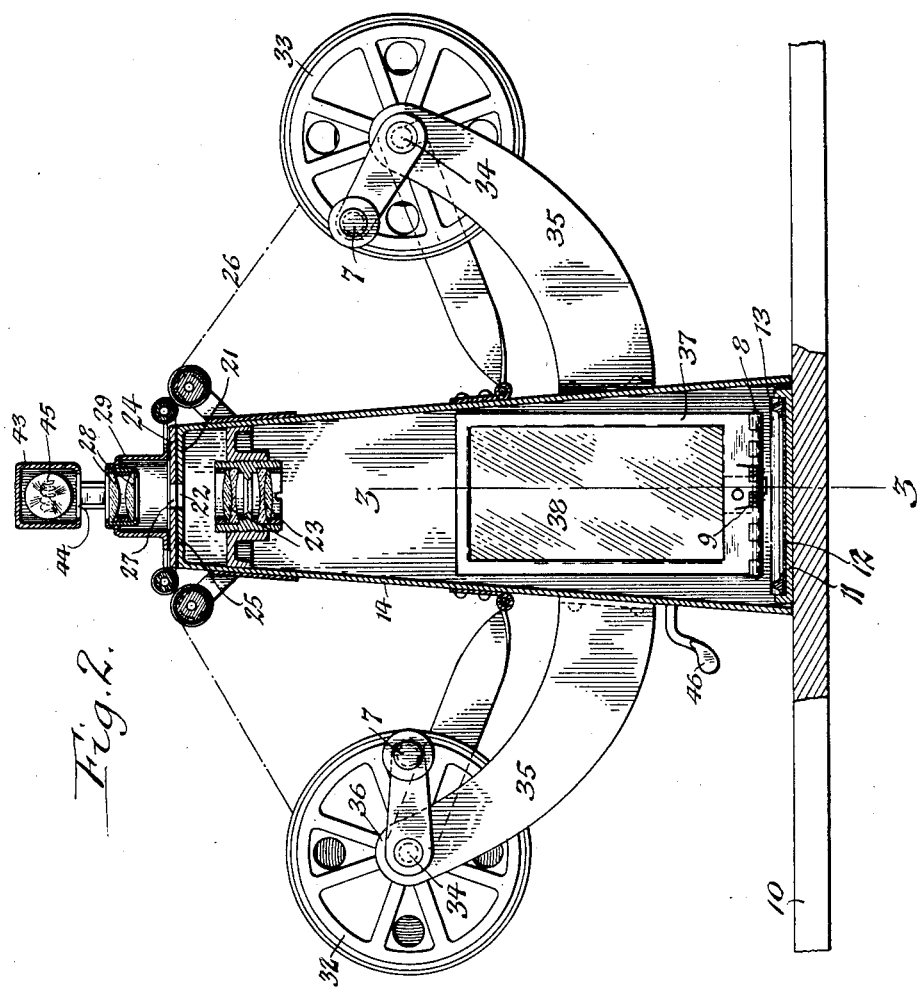

Oct. 1, 1929.  F. A. DORN  1,729,867
PHOTOGRAPHIC SELECTING AND ENLARGING APPARATUS
Filed Feb. 24, 1927  3 Sheets-Sheet 3
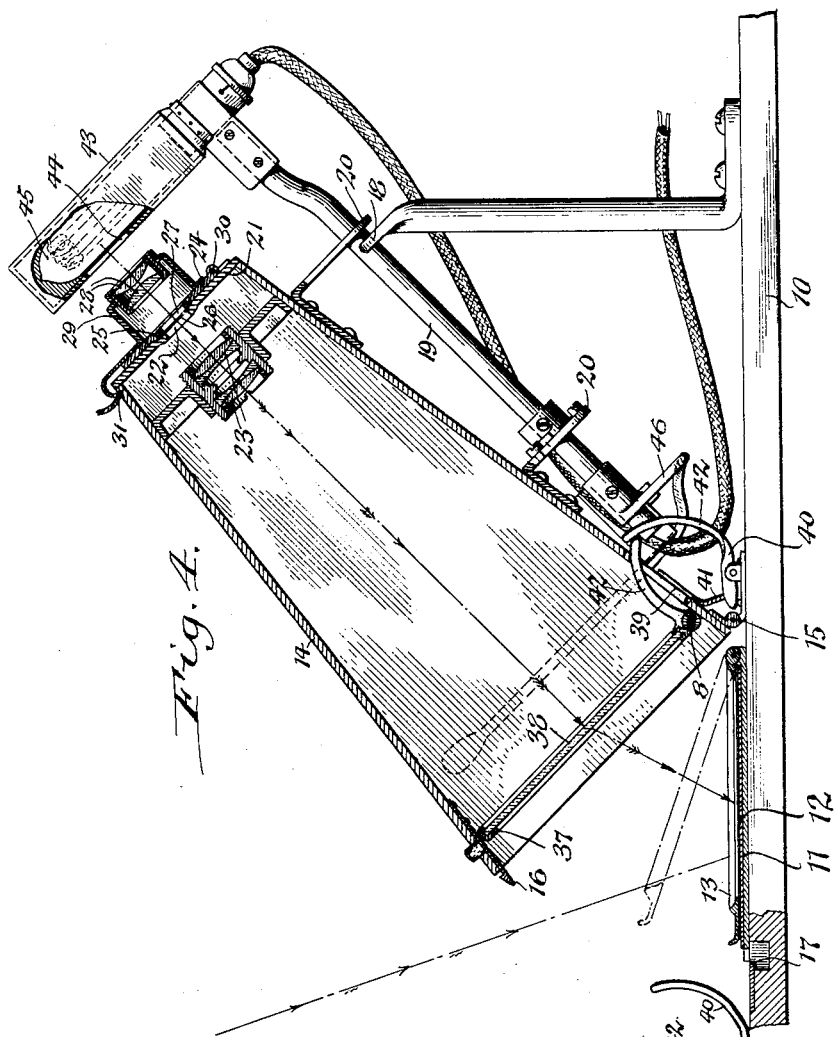
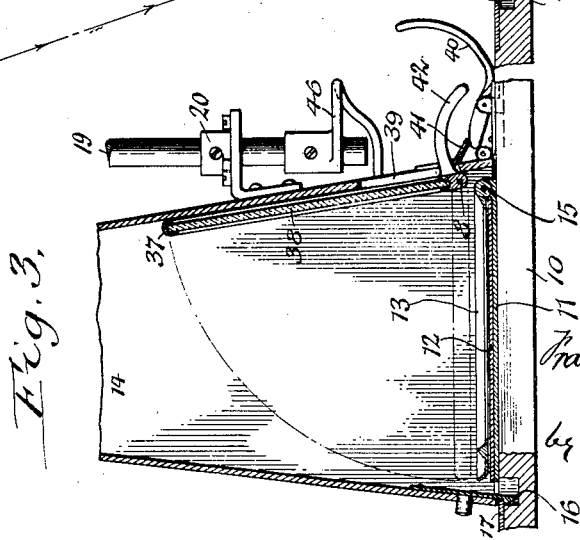
Frank A. Dorn
INVENTOR
ATTORNEYS Patented Oct. 1, 1929

1,729,867

UNITED STATES PATENT OFFICE

FRANK A. DORN, OF HAMBURG, NEW YORK

PHOTOGRAPHIC SELECTING AND ENLARGING APPARATUS

Application filed February 24, 1927. Serial No. 170,619.

This invention relates to a camera for selecting and making enlarged prints from one or more of a series of negatives of a moving picture film.

It has been customary heretofore to make a plurality of individual photographic exposures of a particular subject in different poses and then select one or more of the negatives from which finished prints are to be made for preservation and distribution. This practice is objectionable on account of the difficulty in obtaining the desired pose and the expense attending the same when a considerable number of poses are taken.

This invention therefore proposes taking a series of moving pictures on a strip or film which will catch the subject in a variety of natural poses, then select from these several negatives one or more which are most satisfactory, and then make photographic enlargements of the particular negatives which have been selected for reproduction. In this manner it is possible to take a large number of poses, at comparatively small cost, and in various natural attitudes which are superior to pictures produced by snap shot or time exposures.

It is the object of this invention to provide an apparatus which permits of readily and conveniently selecting one or more negatives from a series taken on a photographic film or stip and then producing enlargements of these negatives with ease and facility and at a relatively low cost.

In the accompanying drawings:

Figure 1 is a perspective view of the photographic selecting and enlarging apparatus embodying my invention, showing the parts in the position while making an enlargement. Figure 2 is a vertical longitudinal section of the same. Figure 3 is a fragmentary vertical transverse section taken on line 3—3, Fig. 2. Figure 4 is a vertical transverse section of the apparatus similar to Fig. 3 but showing the parts in the position which they occupy when selecting a negative from a strip of film containing a series of negatives.

In the following description similar characters of reference indicate like parts in the several figures of the drawings.

The numeral 10 represents the base of the apparatus which may be constructed of wood or other suitable material. On top of this base is arranged a horizontal supporting plate 11 which contains a mirror 12 and to the rear of this plate is pivotally connected a vertically swinging retaining frame 13 whereby a sheet of sensitized paper or the like may be held over the mirror.

Arranged above the base is an upwardly tapering hood 14 which is connected at its lower rear edge by a horizontal hinge 15 with the base so that the hood can be swung forwardly into an upright position in which its lower end encloses the mirror and sensitized sheet holder, as shown in Figs. 1, 2 and 3, or the same may be tilted rearwardly so that its lower end uncovers this mirror and holder. The hood may be fastened in its forward upright position by a catch 16 arranged on its lower front edge and engaging with a keeper 17 on the base, and the extent of its rearward tilting movement may be limited by a stop 18 secured to the rear part of the base and adapted to be engaged by some part on the rear of the hood, for example, the upright shaft 19, which is mounted in bearings 20 on the hood and performs an additional function as will later appear.

At its upper end the hood is provided with a head 21 which has an aperture 22 and below the latter and in line therewith an objective lens 23 of any suitable character is mounted on the interior of the hood. Above the head of the hood is arranged a retaining plate 24 between which and the head of the hood a horizontal longitudinal guideway 25 is formed which is adapted to receive a film or strip 26 containing a longitudinal series of photographic negatives and permit said film to slide lengthwise for presenting its negatives successively to the focal line passing through lens 23, the aperture 22 in the hood, an aperture 27 in the retaining plate 24 and a condenser lens 28 mounted by means of a tube 29 on the upper side of the retaining plate. The latter is movable toward and from the head 21 to permit of inserting a film between the head and the retaining plate or removing the same therefrom by pivotally connecting the ends of the hood, head and the retaining plate, by a hinge 30 and detachably connecting the front ends of these parts by a catch 31.

The film may be mounted and fed across the focal line of the apparatus in any suitable manner but preferably employing two reels 32, 33, which are mounted on opposite sides of the hood and which may be turned so that the film is wound up on one of these reels and unwound from the other. As shown in the drawings each of these reels has its axle 34 provided with a crank 7 for turning the same, and one end of each axle turns in a bearing 36 formed on the outer end of a bracket 35 secured to the adjacent side of the hood while the other end of each axle is engaged by a retaining hood 36 pivoted to swing vertically on the adjacent part of the hood.

Within the lower part of the hood is arranged a ground glass 38 mounted in a frame 37 which is movable into and out of a position across the focal line in the hood. The upward or folding movement of the ground glass is preferably accomplished by a spring 9 wound around the pintle of the hinge 8 which pivotally connects the ground glass frame with the rear wall of the hood and bears with its opposite ends against the hood and ground glass frame, as shown in Fig. 2. The downward or unfolding movement of the ground glass is effected by a vertically swinging shifting lever 40 which is pivoted on the base in rear of the hood and has its front arm engaged by a shifting lug 42 on the adjacent part of the hood and its rear arm engaged by a shifting arm 41 arranged on the rear end of the ground glass frame and projecting through a slot 39 in the rear wall of the hood. Upon turning the hood forward into an upright position the lug 41 releases the lever 40 and permits the spring 9 to raise the ground glass into its upright operative position, as shown in Fig. 3, while upon tilting the hood backward said lug 41, lever 40 and arm 42 operate to move the ground glass into its operative position across the focal line, as shown in Fig. 4.

A lantern casing 43 having an opening 44 in its underside is adapted to swing transversely relative to the focal line of the apparatus for the purpose of bringing an electric lamp 45 within this casing either into the focal line or on one side of the same. This is accomplished by mounting the lamp casing at its rear end on the upper end of the shaft 19. The latter is provided with a forwardly projecting arm 46 whereby the operator can swing the lamp in line with the lens system of the apparatus or to one side of the same. An electric switch 47 is mounted on the hood in the path of the lamp shifting arm 46 so that when the lamp is moved into line with the lens system the electric circuit containing this switch and the lamp will be closed and the lamp will be lighted but when this arm is turned in the opposite direction for moving the lamp out of the focal axis then the switch is permitted to open and extinguish the lamp.

In the operation of this apparatus the film or strip of negatives from which a picture is to be selected is first placed with a part thereof in the guideway between the hood and the film holder and then the film is wound upon one reel and rewound from the other reel by turning the crank of the winding up reel, whereby the successive negatives of the film or strip are exposed at the focal line. While the strip is being thus moved past the focal line the hood is tilted backwardly, the lamp is swung to one side of the focal line and the ground glass is moved automatically across this line, as shown in Fig. 4. The light of the lamp is now caused to shine downwardly through the lens system and the negatives which are successively presented to the focal line whereby enlargements of these negatives are reproduced on the ground glass, the images on the latter are reflected on the horizontal mirror where the same are visible by the operator who at this time is looking downwardly upon the mirror for the purpose of selecting a negative having a particular pose or desired characteristic which best suits the purpose.

Having made the desired selection of the negative the operator now places a sensitized photographic sheet over the mirror and holds it in place thereon by the retaining frame associated therewith, and then moves the hood forwardly into an upright position so that the lens system is at right angles to the sensitized sheet, as shown in Figs. 1, 2 and 3. While thus moving the hood forwardly into an upright position the ground glass plate is automatically moved upwardly out of the focal line and then the lamp is moved into the focal line and lighted so that it shows through the lens system and the negative in the focal line whereby the image of this negative will be printed on an enlarged scale on the sensitized sheet due to the magnifying effect of the objective lens.

After the sensitized sheet has been thus printed the hood is swung backwardly to uncover the sensitized sheet and the latter is developed, fixed and otherwise finished in any approved manner. Obviously these operations are conducted in the dark or in a dark room in order to avoid fogging the sensitized sheet.

It will now be apparent that by the use of this apparatus the negatives or positives of a film can be easily and quickly examined one at a time for selecting one which is most satisfactory and that an enlargement of the chosen negative can be printed expeditiously and conveniently, which is particularly desirable when doing this work on a commercial scale.

I claim as my invention:

1. A photographic apparatus comprising a hood containing an aperture, a lens within the hood, means for moving over said aperture a film containing a series of photographic negatives, a ground glass arranged in said hood and movable into and out of line with said aperture and lens, an electric lamp mounted on the exterior of said hood and movable into and out of its operative position in line with said aperture and lens, and an electric switch operatively related to said lamp and adapted to be closed when said lamp is in line with said aperture and lens and to be opened when said lamp is moved out of line from said aperture and lamp.

2. A photographic apparatus comprising a base, a mirror arranged on said base, a hood movable on said base so as to cover and uncover said mirror and provided with an aperture, means for moving over said aperture a film containing a series of photographic negatives, a lens arranged within said hood in line with said aperture, and a ground glass arranged within the hood and movable into and out of line with said aperture and lens.

3. A photographic apparatus comprising a base, a mirror arranged on said base, a hood movable on said base so as to cover and uncover said mirror and provided with an aperture, means for moving over said aperture a film containing a series of photographic negatives, a lens arranged within said hood in line with said aperture, a ground glass arranged with said hood, and means for moving said glass into and out of line with said lens and aperture comprising a lever mounted on the base and having front and rear arms, a lug arranged on the hood and engaging the front arm of said lever, and an arm arranged on said glass and engaging the rear arm of said lever.

4. A photographic apparatus comprising a base, a mirror arranged on said base, a hood movable on said base so as to cover and uncover said mirror and provided with an aperture, means for moving over said aperture a film containing a series of photographic negatives, a lens arranged within said hood in line with said aperture, a ground glass arranged within the hood and movable into and out of line with said aperture and lens, and a frame which is adapted to hold a sensitized sheet over said mirror and which is movably mounted on said base.

5. A photographic apparatus comprising a hood containing an aperture, a lens arranged within the hood, means for moving across said aperture a film negative, a screen arranged within the hood, and movable means for supporting said screen and shifting the latter into and out of the focal plane of said lens.

6. A photographic apparatus comprising a base provided with an exposure plane; a hood adapted to be placed with one of its ends over said exposure plane and having an aperture at its opposite end; means for guiding across said aperture a film containing a series of photographic negatives; a screen arranged within the hood, and means movably supporting said screen and adapted to shift the same across the focal plane of said lens when the hood is moved over said exposure plane and to shift said screen to one side of said focal plane upon moving said hood away from said exposure plane.

7. A photographic apparatus comprising a base; a mirror arranged on said base; a hood adapted to be placed with one end over said mirror and provided at its opposite end with an aperture; means for guiding across said aperture a photographic film negative; a screen arranged within the hood and movable into and out of the focal plane of said lens; and means for securing a sensitized member over said mirror.

In testimony whereof I hereby affix my signature.

FRANK A. DORN.